United States Patent Office 3,155,725
Patented Nov. 3, 1964

3,155,725
NAPHTHYLCYCLOPROPYLAMINES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed June 14, 1960, Ser. No. 35,911
9 Claims. (Cl. 260—570.5)

This invention relates to new naphthylcyclopropylamines which have useful pharmacodynamic activity. More specifically, these compounds are potent inhibitors of monoamine oxidase thereby having useful antidepressant and/or hypotensive activity.

The novel naphthylcyclopropylamines of this invention are represented by the following general formula:

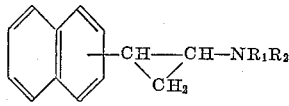

I in which $R_1$ and $R_2$ are hydrogen, lower alkyl of 1 to 6 carbon atoms or benzyl.

The compounds in which $R_1$ and $R_2$ are methyl or hydrogen are preferred.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in an aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8 - bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as cis-trans isomers due to the geometrical arrangement of the naphthyl and amino moieties with respect to the cyclopropane ring, and further as d,l optical isomers. Unless otherwise specified in the specification and the accompanying claims, it is intended to include all isomers, particularly the separated cis or trans isomers and the resolved d- and l-cis or d- and l-trans isomers as well as the cis-trans mixtures of these isomers.

The novel naphthylcyclopropylamines are prepared from the known naphthoylpropionic acids (Haworth, J. Chem. Soc. 1932, 1129) or vinyl naphthalenes [Pickard and Kenyon, J. Chem. Soc. 105, 1126 (1914)]. The vinyl starting material is condensed with ethyl diazoacetate to give ethyl 2 - naphthylcyclopropanecarboxylate which is hydrolyzed by refluxing in alkali to give the carboxylic acid. The cis-trans mixture of acids is separated if desired or alternatively is esterified directly with diazomethane to give the methyl esters which are reacted with hydrazine to yield the hydrazide. The acid hydrazide is diazotized with hydrochloric acid and sodium nitrate and the resulting azide is thermally decomposed by refluxing in toluene solution with methanol according to the general Curtius rearrangement reaction to give the methyl urethan. The addition of methanol converts the intermediate isocyanate to the methyl urethan during the reaction. The urethan derivative is then hydrolyzed by refluxing for a long period of time for example up to 40 hours, with a saturated solution of barium hydroxide octahydrate in methanol to yield the 2-(naphthyl)cyclopropylamine. The free base is further converted to acid addition salts, for example the hydrochloride salt by reaction with ethereal hydrogen chloride, as outlined more fully above.

2-(naphthyl)cyclopropylmethylamine is prepared by refluxing an ethanolic solution of the free amine and benzaldehyde for several hours, heating the benzalamine derivative with methyl iodide in a sealed tube at from 100° C. to 150° C. and refluxing the reaction product with ethanol. The corresponding dimethylamino derivative is prepared by refluxing a mixture of the primary amine with aqueous formaldehyde and formic acid. Reduction of the benzalamine gives the monobenzyl analogue.

The alkylamino derivatives are alternatively prepared by other methods. Thus 2-(naphthyl)cyclopropylamine is formylated to give the N-formyl derivative which is alkylated with sodium hydride and an alkyl iodide. The formyl group is then removed by hydrolysis with aqueous acid. Also, the N-benzyl protective moiety can be used then removed by reduction using palladium-on-charcoal in the presence of an equivalent of acid.

The N- higher alkyl, dialkyl or dibenzyl derivatives are prepared by direct alkylation of the primary amine with the alkyl chloride, bromide or iodides in the presence of an alkaline agent. Alternatively the cyclopropyl rings may be formed from the naphthylpropionic acids as described in the examples for preparing the β-naphthylcyclopropylamines of this invention.

The foregoing is a general description of the main synthetic routes in the preparation of 2-(naphthyl)-cyclopropylamines. It will be readily apparent to one skilled in the art that variations of these procedures are possible. Of particular advantage as preparative procedures are the methods thoroughly discussed above, namely, conversion of the separated isomeric 2-(naphthyl)-cyclopropanecarboxylic acids to the intermediate acid azides and subsequent rearrangement of the azides to the 2-(naphthyl)cyclopropylamines.

The following examples are not limiting but are illustrative of the procedures for the preparation of compounds of this invention embraced by the general Formula I.

*Example 1*

A mixture of 20 g. of 1-vinylnaphthalene and a slight molar excess of ethyl diazoacetate is heated at 100° C. for two hours, then at 140–150° C. for three hours. The mixture is distilled under reduced pressure to give ethyl 2 - (1 - naphthyl)cyclopropanecarboxylate, B.P. 98–184° C. at 0.5–2.0 mm. The ester (19 g.) is hydrolyzed with a potassium hydroxide water-alcohol solution at reflux for five hours. The solvents are removed in vacuo and the solid residue taken up in water. The aqueous solution is made acid with hydrochloric acid to separate the free acid. A mixture of 12 g. of 2-(1-naphthyl)cyclopropanecarboxylic acid in water-acetone is cooled to 0° C. while a solution of 15.8 ml. of triethylamine in 190 ml. of acetone is added followed by a solution of 11 ml. of ethyl chloroformate in 45 ml. of acetone at temperatures below 5° C. The mixture is stirred and quenched in an ice-water slurry. The water mixture is extracted with ether. The organic extracts are salted out, dried and evaporated at low temperature. The residue is covered with dry toluene and heated on the steam bath until the evolution of gas ceases. The solvent is removed to leave an oil, B.P. 140–143° C. at 0.7 mm., 2-(1-naphthyl)cyclopropane isocyanate.

A mixture of 10 g. of the isocyanate and 249 ml. of 20% hydrochloric acid is stirred and refluxed for 4 hours. After concentration, the residue is shaken with water. After extraction with ether, the aqueous solution is neutralized and extracted again with ether. The residue extracted is dissolved in isopropanol and made acid with hydrochoric acid to give 2-(1-naphthyl)cyclopropylamine hydrochloride, M.P. 213–215° C. from isopropanolether.

*Example 2*

A mixture of 55.5 g. of 2-(2-naphthoyl)propionic acid and 155 ml. of 40% sodium hydroxide solution is stirred while cooling in an ice-bath. Water (100 ml.) is added, followed by the addition of 25.5 g. of sodium borohydride (stabilized water solution). During this addition the temperature rises from 18° to 34° C. The mixture is stirred for two hours at room temperature. The cooled mixture is acidified with 100 ml. of concentrated hydrochloric acid. After adding 100 ml. of water, the precipitate is filtered and washed thoroughly with water. After drying for two days at room temperature there is 56.6 g. of solid 4-hydroxy-4-(2-naphthyl)butyric acid.

4-hydroxy-4-naphthylbutyric acid (56.6 g.) is heated in an oil bath at 140–160° C. at 25–30 mm. for two hours. The infra-red spectrum confirmed the presence of a lactone ring.

The lactone (52 g.) is dissolved in 100 ml. of dry benzene and 61 ml. of thionyl chloride is added. The mixture is refluxed for four hours. While cooling in an ice-bath, 175 ml. of a saturated solution of hydrogen chloride in ethanol is added. The mixture is allowed to stand for 24 hours. The excess thionyl chloride is removed and the residue washed out twice with benzene. The residual 61 g. of dark oil is distilled using a molecular still. This gives 46.1 g. of an orange oil, B.P. 140° C. at 1μ, ethyl 4-chloro-4-(2-naphthyl)butyrate.

To a solution of 300 ml. of dry benzene and 54.3 g. of t-butanol stirred under nitrogen and heated to 60° C. is added 8.17 g. of potassium metal. The addition of potassium requires an hour. The mixture is stirred for two hours at 60° C. and then 46.1 g. of ethyl 4-chloro-4-(2-naphthyl)butyrate is added. The mixture is stirred and refluxed for five hours under a nitrogen atmosphere. After cooling, 200 ml. of water is added and the layers separated. The aqueous layer is extracted twice with ether. The solvent is removed from the combined ethereal layers. The residual oil is dissolved in 100 ml. acetone, treated with 15 ml. of a 1% aqueous potassium permanganate solution and the mixture shaken for one minute. The mixture is diluted with 600 ml. of water and extracted with ether. The dried ether extracts are evaporated leaving 34.4 g. of an oil which slowly crystallizes on standing trans-ethyl 2-(2-naphthyl)cyclopropanecarboxylate.

The ester (34.4 g.) is hydrolyzed as described above in Example 1. The resulting solid acid is recrystallized from 50% ethanol and melts at 150–152.5° C., trans 2-(2-naphthyl)cyclopropanecarboxylic acid. The acid (22.2 g.) is converted to the isocyanate in the same manner as described above. The isocyanate (22 g.) is converted to the amine in the same manner as described to give trans-2-(2-naphthyl)cyclopropylamine hydrochloride, M.P. 215–217° C.

*Example 3*

A solution of 8.5 g. of 2-(1-naphthyl)cyclopropylamine and 5.6 g. of benzaldehyde in 50 ml. of absolute ethanol is heated at reflux for four hours. The solvent is removed under reduced pressure to give the benzal derivative.

A mixture of 7.8 g. of the benzal derivative and 8.6 g. of methyl iodide is heated in a sealed tube at 100° C. for 12 hours. The reaction product is heated with 100 ml. of ethanol for several hours. The solvent is evaporated and the base liberated with 40% potassium hydroxide solution. Extraction with ether gives 2-(1-naphthyl)cyclopropylmethylamine.

The amine (500 mg.) is reacted with maleic acid in ethyl acetate to give the maleate salt.

*Example 4*

A mixture of 2 g. of 2-(1-naphthyl)cyclopropylbenzalamine, prepared as in Example 3, in 50 ml. of ethanol with palladium-on-charcoal is hydrogenated at lower pressure. Evaporation of the filtered alcoholic solution gives the desired 2-(1-naphthyl)cyclopropylbenzylamine.

*Example 5*

A 40% aqueous solution of formaldehyde (5 g.) is added to a cooled solution of 3.8 g. of trans-2-(2-naphthyl)cyclopropylamine in 6 g. of 90% formic acid. After heating at reflux for 24 hours, the cooled reaction mixture is treated with 3 ml. of concentrated hydrochloric acid. The mixture is evaporated to dryness. The residue is made alkaline with 50% potassium hydroxide solution then extracted into ethyl ether. The ether extracts give the desired trans-2-(2-naphthyl)cyclopropyldimethylamine.

This base in ether is titrated with sulfuric acid to give the sulfate salt.

*Example 6*

A mixture of 5 g. of 2-(1-naphthyl)cyclopropylamine, 5 g. of n-butyl bromide, 2.5 g. of potassium carbonate and 100 ml. of aqueous ethanol is heated at reflux for 24 hours. Butyl bromide (3 g.) is added to the mixture and the reflux period extended. The alcohol is removed by evaporation. The residue is shaken in water, neutralized and extracted with ether to give, by fractional crystallization, 2-(1-naphthyl)cyclopropyldibutylamine. This amine (750 mg.) is taken up in ether and treated with hydrogen chloride gas to form the hydrochloride salt.

*Example 7*

A mixture of 3 g. of 2-(1-naphthyl)cyclopropylamine in 10 g. of formaldehyde-formic acid mixture is reacted and worked up as described in Example 5 to give the desired 2-(1-naphthyl)cyclopropyldimethylamine.

This base (500 mg.) is dissolved in ether and saturated with dry hydrogen bromide gas to form the hydrobromide salt.

What is claimed is:

1. A chemical compound of the class consisting of a free base and its salts of pharmaceutically acceptable acids, said free base having the formula:

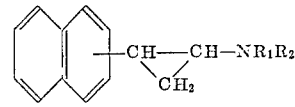

in which $R_1$ and $R_2$ are members selected from the group consisting of hydrogen, benzyl and lower alkyl having from 1 to 6 carbon atoms.

2. A chemical compound having the formula:

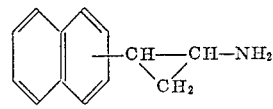

3. 2-(1-naphthyl)cyclopropylamine.
4. 2-(1-naphthyl)cyclopropylamine hydrochloride.
5. trans-2-(2-naphthyl)cyclopropylamine.
6. trans-2-(2-naphthyl)cyclopropylamine hydrochloride.
7. A chemical compound having the formula:

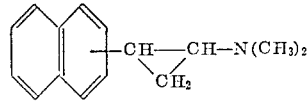

8. 2-(1-naphthyl)cyclopropyldimethylamine hydrochloride.

9. trans-2-(2-naphthyl)cyclopropyldimethylamine.

References Cited in the file of this patent

UNITED STATES PATENTS

| | | |
|---|---|---|
| 2,997,422 | Tedeschi | Aug. 22, 1961 |
| 3,050,559 | Burger | Aug. 21, 1962 |

OTHER REFERENCES

Tedeschi et al.: "Proc. Soc. Exptl. Biol. Med.," volume 102, pages 380–81 (1959).

Conant et al.: "The Chemistry of Organic Compounds," page 549, 4th ed. (1952).

Burger et al.: Journal of the American Chemical Society, vol. 70, pages 2199–2201 (1948).